Dec. 19, 1944.   R. G. JANES   2,365,412
PRIME MOVER CONTROL SYSTEM
Filed Jan. 29, 1943
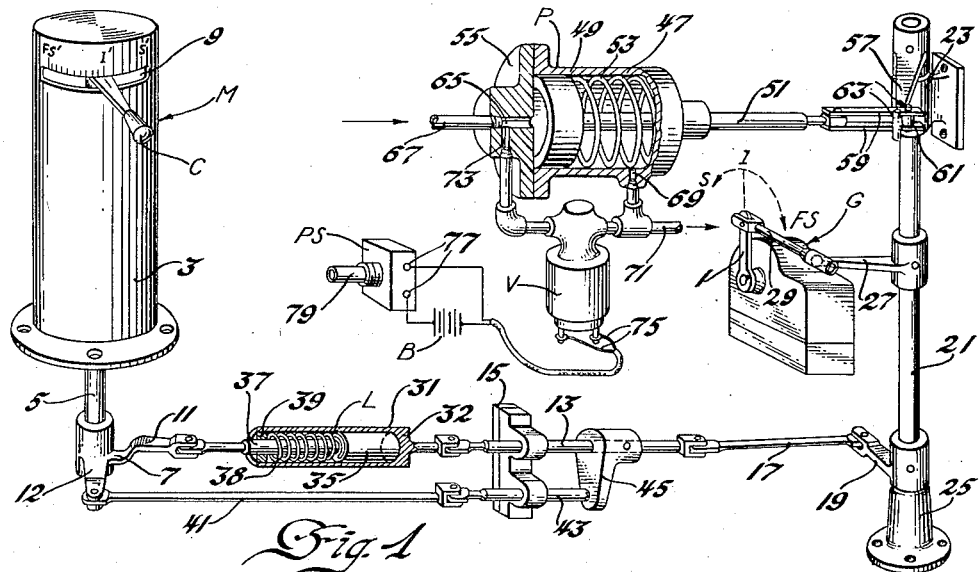
Fig. 1
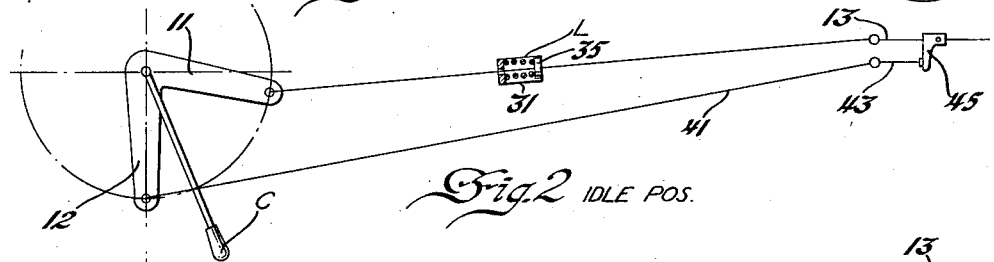
Fig. 2  IDLE POS.
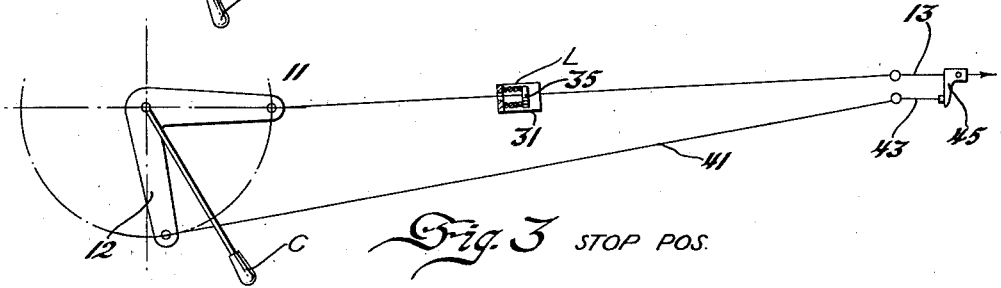
Fig. 3  STOP POS.
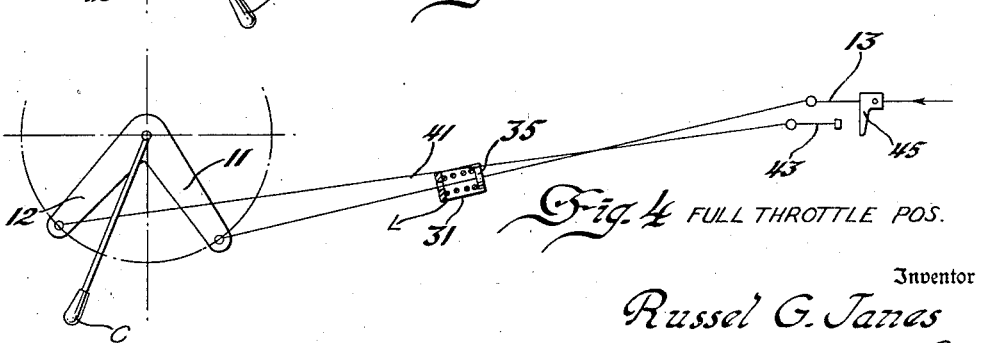
Fig. 4  FULL THROTTLE POS.
Inventor
Russel G. Janes
By Blackmore, Spencer & Flint
Attorneys Patented Dec. 19, 1944

2,365,412

UNITED STATES PATENT OFFICE 2,365,412

PRIME MOVER CONTROL SYSTEM

Russel G. Janes, La Grange, Ill., assignor to General Motors Corporation, Detroit, Mich., a corporation of Delaware Application January 29, 1943, Serial No. 473,941

10 Claims. (Cl. 123—98)

The present invention relates to means for controlling the speed of prime movers, and more particularly to controlling means for Diesel prime movers for locomotives.

It has been found that the speed increase of a locomotive Diesel prime mover for a given throttle movement should be gradual when the locomotive is started, and that the speed increase of the prime mover should be greater for the same throttle movement as the speed of the locomotive increases to properly satisfy the variable demands imposed on the locomotive when used in different types of service and under different operating conditions.

The principal object of the present invention is to provide a simple control system for locomotive prime movers, whereby the speed of the locomotive prime mover and the stopping thereof may be properly controlled by a single control lever, and the speed thereof reduced automatically to a safe value independent of the manual control lever by means associated with the engine lubricating system upon a defect occurring therein.

The combined control means by which the above stated object is accomplished will become apparent by reference to the following detailed description when read in connection with the accompanying drawing, in which—

Figure 1 is a perspective view of my combined control system, and

Figures 2, 3 and 4 are diagrammatic views showing certain of the elements shown in Figure 1, in different control positions.

The control system illustrated in Figure 1 is particularly adapted for controlling a locomotive prime mover of the Diesel type, and generally comprises a governor G and manually operable and automatic power operated control means therefor which are generally indicated respectively at M and P.

The governor G is of any well known type provided with means, not shown, which is driven by the engine, not shown, and which acts in response to variations in the engine speed to regulate the fuel supplied to the engine in a well known manner to cause operation thereof at substantially constant speed. The governor G is shown provided with a speed-setting lever 1 which operates conventional governor speed-setting means, not shown, included therein to vary the speed response of the governor in order to cause operation of a Diesel engine prime mover at any one of a plurality of preselected constant values of speed and power output, in a well known manner, in which these values are directly proportional to the amount of movement of the speed-setting lever. The governor speed-setting lever 1 is movable between engine stop, engine idle and engine full-speed control positions, indicated respectively at S, I and FS, by means of linkage, to be described, which is interconnected with both the manual control means M and automatic power operated means P.

The manually operable means M comprises a controller housing 3 in which a controller shaft 5 is mounted for rotation about a vertical axis and having a manually operable control lever C and a bell crank lever 7 secured thereto. The control lever C is shown extending outwardly through a quadrant slot 9 in the housing 3. Control linkage is provided between one arm 11 of bell crank 7 and the governor speed-setting lever which comprises respectively: a non-compressible resiliently extensible link, shown generally at L, a rod 13 which is mounted for longitudinal sliding movement in a guide member 15, a link 17, a lever 19 secured to a shaft 21 which is mounted for rotation about a vertical axis in bearings 23 and 25, a second lever 27 secured to the shaft 21 and link 29.

The resiliently extensible link L comprises a cylinder portion 31, a plunger 35 and plunger rod portion 37, which are movable in the cylinder portion. The plunger 35 is normally held in contact with the head 32 of the cylinder portion 31 by a compression spring 38 which surrounds the plunger rod 37 and is retained between the plunger 35 and a retainer member 39, which is secured in the open end of the cylinder portion 31 and is provided with a suitable opening to allow movement of the plunger rod 37 with respect thereto.

A second control linkage is provided between the other arm 12 of the bell crank 7 for operating a portion of the above described linkage to cause extension of the link and movement of the governor speed-setting lever 1 to the engine stop position S against the action of the spring 38 included in the extensible link L. This second linkage respectively comprises: a link 41 and a push-rod 43, which is also mounted for longitudinal sliding movement in the guide member 15 about an axis parallel to the rod 13; a flange 45 which is secured to the rod 13 so that the outer end of the push-rod just touches this flange when the control lever C is moved to the engine-idle position, as shown in Figures 1 and 2, in which position of these elements the link L is maintained in the normal non-extended position.

It will be apparent from Figures 2 and 3, which show the elements in the idle and stop positions respectively, that the arm 11 of the bell crank lever is located substantially in a dead center position with respect to the extensible link L, and that the arm 12 of the bell crank lever is located approximately at right angles to the rigid link 41 when the control lever C is in the idle position I' so that upon counter-clockwise movement of the control lever C to the engine stop control position S', as shown in Figure 3, the push-rod 43 will move the flange 45, rod 13 and cylinder portion 31 of the link L to the right with respect to the plunger rod portion 35 an amount necessary to cause movement of the governor speed-setting lever 1 to the engine stop position S. It will be evident that additional manual effort is required to move the governor speed-setting lever 1 to the stop position, as then the link L will be extended by compression of the spring 38 included therein. It will likewise be apparent by reference to Figures 2 and 4, for a constant rate of clockwise movement of the control lever C from the idle position, as shown in Figure 2, toward the full-speed position, as shown in Figure 4, that the push-rod 43 will be moved away from the flange 45, and that the governor speed-setting lever 1 will be moved at an increasing rate toward the full-speed position for a constant rate of movement of the control lever C, through the action of the spring 38 in the extensible link L, which exerts sufficient force between the cylinder portion 31 and plunger portion 35 of the link L to prevent extension thereof, unless the governor speed-setting lever 1 is restrained from moving toward the full-speed position or is moved in the opposite direction toward the idle position by the action of the power means P which will be described subsequently. Conversely, when the control lever C and governor speed-setting lever 1 are in the full-speed positions, counter-clockwise movement of the control lever back to the idle position at a constant rate places the link L in compression, and being non-compressible, causes a decreasing rate of movement of the governor speed-setting lever 1 back to the idle position for a constant rate of movement of the control lever C.

This variable rate of movement of the speed-setting lever 1 for a constant rate of movement of the control lever C enables the operator to best obtain variable operating characteristics from the locomotive suitable to meet the various operating conditions required from a locomotive used in various types of service.

The power means P, as best shown in Figure 1, comprises a power cylinder 47 in which a piston 49 and a piston rod 51 are slidably mounted. A compression spring 53 is shown located in the cylinder 47 in concentric relation to the piston rod 51 in order to cause the piston and rod to be continuously biased to the left toward the cylinder head 55. The outer end of the piston rod 51, shown projecting outwardly of the cylinder, is operably connected by a lost-motion connection to a lever 57 which is also fixed to the shaft 21. This lost-motion connection comprises a pair of strap links 59 each pivoted to the piston rod at diametrically opposite points and connected in spaced relation at their opposite ends by a spacer pin 61. The end of the lever 57 is shown extending between the strap links 59, and is provided with bosses spaced with respect to the lever axis between which the strap links are located, and suitably guided to prevent excessive movement of the strap links toward or away from the axis of the shaft 21 on which the lever 57 is secured, and also to permit the necessary limited angular movement of the lever 57 and shaft 21 with respect to the strap links 59 to cause movement of the speed-setting lever to the various control positions. The spring 53 exerts sufficient force on the piston 49, piston rod 51, strap links 59 and spacer pin 61 to hold this pin in contact with the lever 57 and prevent movement thereof to the right, or counter-clockwise, as viewed in Figure 1, in order to prevent movement of the shaft 21, lever 27, link 29 and the governor speed-setting lever 1 from the idle position to the full-speed position, when the control lever C is moved to the full-speed position. Movement of the control lever from the idle to the full-speed position with the lever 57 held in this position by the spring 53 merely causes compression of the weaker spring 38 in the link L and extension thereof, but no movement of the governor speed-setting lever toward its full-speed position takes place. The lever 57, however, may be moved in the opposite direction relative to the strap links 59 by means of the previously described action of the push-rod 43 on the flange 45, upon movement of the control lever C to the stop position opposed by the action of the spring 38 in the link L, which causes movement of the governor speed-setting lever 1 to its stop position.

Movement of the piston 49 to the right in the cylinder 47 against the action of the spring 53 to permit unrestrained movement of the governor speed-setting lever 1 to the full-speed position by the control lever C is accomplished by the application of fluid pressure to the piston 49 through a pressure inlet opening 65 provided in the cylinder head 55. A pipe 67, shown threaded in the opening 65, is provided for connection with the pressure outlet opening of the conventional engine lubricating pump, not shown, so that the piston 49 is moved to the right in the cylinder against the action of the spring 53 an amount necessary to allow unrestrained counter-clockwise movement of the lever 57 to permit movement of the speed-setting lever 1 to the full-speed position only when the engine lubricating pump pressure is sufficient to cause adequate lubricating of the engine at idling speed. A drain opening 69 is also provided in the cylinder 47 to permit this movement of the piston. This movement of the piston causes the spacer pin 61 of the strap links 59 to be moved away from the lever 57, so that the governor speed-setting lever 1 may then be freely moved toward the full-speed position FS by the control lever C without causing extension of the extensible link L. With the above described lost-motion connection between the piston 49 and lever 57, should the pump pressure fall below the value selected for safe operation of the engine at idling speed, the spring 53 will automatically return the piston 49 to its normal position by causing extension of the extensible link L when the control lever C is between the idle and full-speed positions, thereby causing the speed-setting lever 1 to be quickly returned to the idle speed position S independently of the control lever, so that safe operation of the engine at idling speed will take place. With the speed-setting lever retained in the idle position by the spring 53, any movement of the control lever C from the idle position to the full throttle position merely extends the link L by compression of the spring 38 therein to prevent the operator from increasing the engine speed.

In order to provide further protection for the engine a by-pass connection is provided between the pressure inlet opening 65 in the cylinder 47 and a pipe 71, which is connected with the engine lubricating sump, not shown, and also with the drain opening 69. This by-pass connection includes a by-pass opening 73 in the cylinder head 55, shown in register with the inlet opening 65, and suitable pipe fittings, including an electromagnetically actuated by-pass valve V of a well known type, which when deenergized closes the by-pass connection. The electromagnet winding terminals 75 of this valve are shown connected in series circuit relation with a battery B and the contact terminals 77 of a pressure responsive switch PS, of a well known type, in which the switch contacts, not shown, are normally closed, and are opened by action of the pressure element 79 of the switch at a preselected value of pressure in a well known manner. The pressure element 79 of the pressure responsive switch PS is adapted to be screwed into the pressure outlet passage of the conventional engine piston cooling oil pump, not shown, so that for a preselected rise in pressure above a preselected minimum safe value necessary to provide adequate cooling of the engine pistons, the contacts of the switch PS will remain open to deenergize the winding of the electromagnetically actuated valve V, and cause it to close off the by-pass opening 73. Should the pressure on the pressure element 79 of the switch PS fall below this minimum value, the contacts of the switch PS will close to energize the winding of the electromagnetically actuated valve V, and cause it to open the by-pass opening 73 directly to the engine sump, and permit the spring 53 to move the piston 49 to the left, and also cause movement of the governor speed-setting lever 1 to the idle position, independently of the position of the control lever C, to further protect the engine against damage.

I claim:

1. A control system for a prime mover comprising a manually operable prime mover control element movable between stop, idle and full-speed control positions, resiliently extensible control linkage connected to and movable without extension thereof by movement of said control element between the idle and full speed control positions and a second control linkage also connected to and movable by said control element into operable contact with said first mentioned control linkage to cause extension of a portion thereof only upon movement of said control element from the idle to the stop control position to oppose such movement of said element.

2. A speed controlling system for a prime mover comprising a prime mover speed-setting lever movable between stop, idle and full-speed control positions, a manually operable prime mover control element movable between stop, idle and full-speed control positions, non-compressible and resiliently extensible connecting means connected between said lever and said element so as to only permit movement of said lever between the idle and full-speed control positions upon movement of said control element between corresponding control positions, and means also connected to and movable by said control element into contact with said extensible connecting means for causing extension and movement of a portion thereof in order to cause further movement of said lever from the idle to the stop position for a corresponding movement only of said control element.

3. A speed controlling system of the type described comprising a speed-setting lever movable between stop, idle and full-speed control positions, a manually operable control element movable between stop, idle and full-speed control positions, connecting linkage including non-compressible and resiliently extensible means connected between said lever and said manually operable control element for moving said lever between the idle and full-speed positions only, a plurality of means for contacting and moving a portion of said connecting linkage to cause extension of said extensible means and movement of said speed-setting lever toward the idle and stop positions only, one of said means comprising power-operated spring-opposed means, a lost motion connection between said last-named means and said connecting linkage to cause return movement only of said lever from the full-speed to the idle position independently of said manually operable control element upon interruption of the power supply, and another of said means comprising a second linkage also connected to said control element for moving said lever from the idle to the stop control position with respect to said lost-motion connection only when said control element is moved from the idle to the stop control position.

4. A control system for a prime mover comprising a speed-setting lever for the prime mover, a manually operable speed control element movable between stop, idle and full-speed control positions, a resiliently extensible control linkage connected between said control element and said prime mover speed-setting lever to move said lever an amount necessary to control operation of said prime mover between idle and full-speed without extension of said linkage, fluid pressure-operated means adapted to be connected to the fluid-pressure lubricating system of the prime mover, a lost-motion connection between said control linkage and said fluid pressure-operated means, spring means for holding said lost-motion connection in a position to prevent movement of said speed-setting lever by said control element from the idle position toward the full speed position without causing extension of said control linkage until the lubricating fluid pressure of the prime mover builds up to a given value.

5. A control system for a prime mover comprising a speed-setting lever for the prime mover, a manually operable control element movable between stop, idle and full-speed control positions, a resiliently extensible control linkage interconnecting said lever and control element for normally moving said speed-setting lever an amount just necessary to cause operation of said prime mover at values of speed between idle and full speed, a second control linkage also connected to said control element for causing extension of said first-named linkage thereby to cause movement of said speed-setting lever an amount to cause the prime mover to stop upon movement of said control element from the idle to the stop control position, and means for permitting movement of said lever by said element and for automatically causing the return of said lever to a position such that the prime mover speed is reduced to a safe value independently of said control element, said means including pressure-operated means adapted to be connected to the pressure lubricating system of the prime mover, spring means for opposing movement of said pressure operated means when the pressure applied is below a safe value and a lost-motion connection interconnecting said pressure-operated means to a portion of said resiliently extensible linkage.

6. A prime mover control system comprising a prime mover governor provided with a speed-setting lever movable between stop, idle and full-speed control positions, a manually operable speed control lever movable between stop, idle and full-speed control positions, and control connections between said speed-setting lever and said control lever comprising a bell crank lever operable by said speed control lever, an extensible connection between one arm of said bell crank lever and said speed-setting lever to cause variable movement of said speed-setting lever for uniform movement of said control lever between the idle and full-speed positions only, and a push-rod connected to another arm of said bell crank lever for movement into contact with said extensible connection to extend same only upon movement of said control lever from the idle to the stop control position in order to cause a corresponding movement of said speed-setting lever.

7. A locomotive prime mover control system comprising a prime mover speed-setting control lever movable between stop, idle and full-speed control positions, a manually operable prime mover speed control lever movable between stop, idle and full-speed control positions, an extensible control connection interconnecting said speed control and said speed-setting levers so that the rate of movement of said speed-setting lever increases for constant movement of said speed control lever between the idle and full-speed control positions only, and a push-rod also operably connected to said speed control lever and movable thereby into contact with said extensible connection to extend same and cause movement of said speed-setting lever to the stop position from the idle position only upon movement of said control lever between corresponding control positions.

8. A speed control system for locomotive engine, comprising an engine speed-setting lever movable between stop, idle and full-speed control positions, pressure operated and spring biased means for permitting unrestrained movement of said speed-setting lever between said control positions and for biasing and returning said lever to the idle position from the full-speed position upon a drop in pressure below a preselected value, said pressure operated and spring biased means adapted to be connected to the engine lubricating system, a manually operable speed control lever movable between stop, idle and full-speed control positions, a resiliently extensible connection between said levers to cause corresponding movement thereof only between idle and full-speed control positions and to permit independent return movement of said speed-setting lever from the full-speed to the idle control position, and a push-rod connection between said control lever and extensible connection for extending same to cause further movement of said speed-setting lever to the stop position from the idle position and to restrain movement of said control lever between these control positions.

9. A control system for a prime mover comprising an angularly movable and manually operable prime mover speed control element movable between stop, idle and full-speed positions, a prime mover speed-setting lever movable between stop, idle and full-speed positions, said speed-setting lever providing substantially equal values of speed increase for similar increments of movement between the idle and full-speed positions, means connecting the control element and speed-setting lever, said means including a member effecting increments of movement of the speed-setting lever which increase in magnitude with respect to predetermined movements of the control element as the control element moves away from the idle position toward the full-speed position, and said means also including a member for effecting movement of the speed-setting lever from the idle to the stop position upon movement of control element from the idle to the stop position.

10. A control system for a prime mover a manually operable prime mover speed control element movable between stop, idle and full-speed positions, a bell crank actuated by the control element and having a pair of angularly disposed arms, a prime mover speed-setting lever movable between stop, idle and full-speed positions, one of said bell crank arms having means connecting it to the speed-setting lever, said means being so disposed with respect to said arm that linear movement of said means corresponding to predetermined angular movement of said arm increases as the full-speed position is approached, and a second means actuated by the other of said arms for effecting movement of the speed-setting lever from the idle to the stop position in response to actuation of the control element between corresponding positions.

RUSSEL G. JANES.